United States Patent Office 2,797,628
Patented July 2, 1957

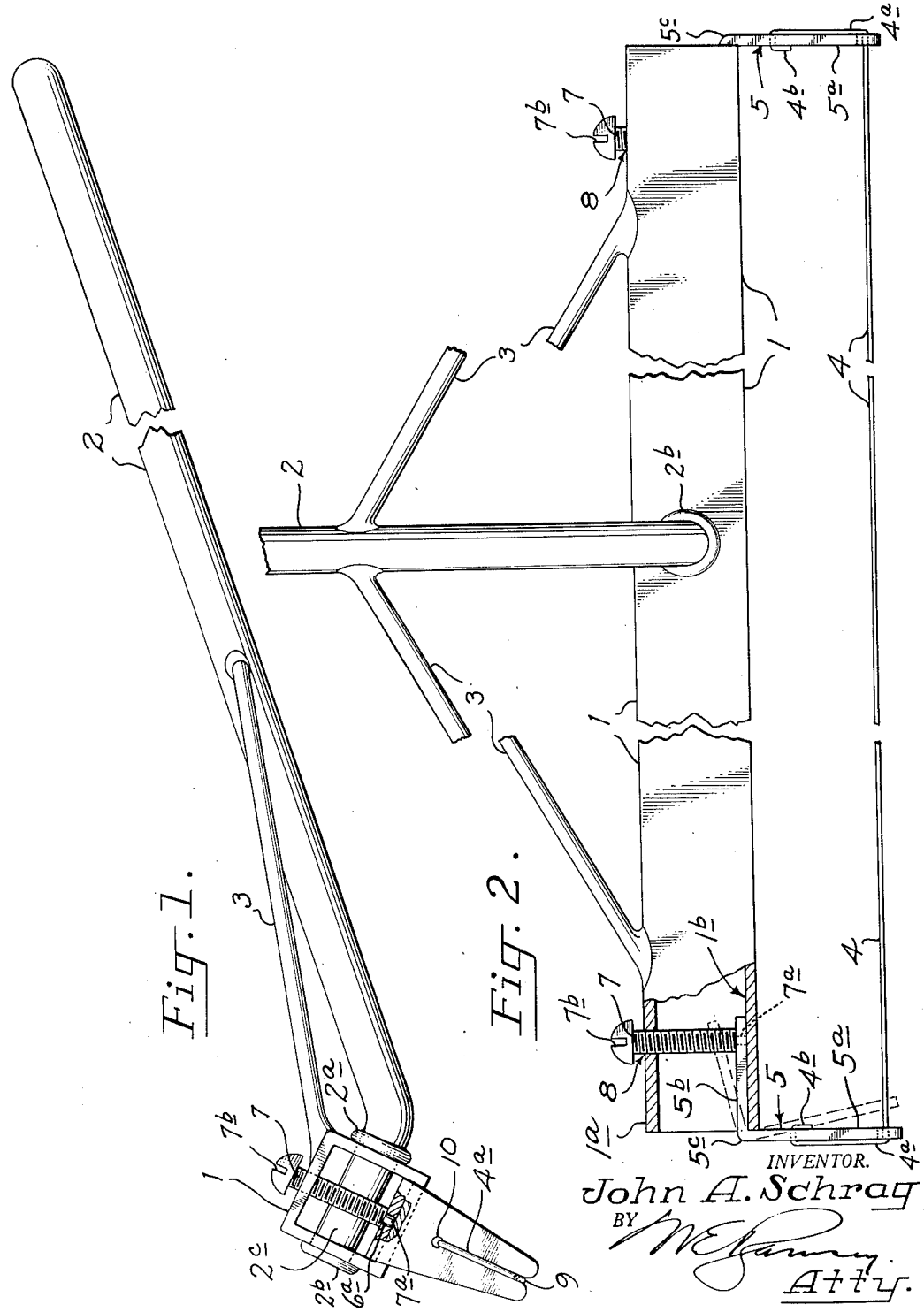

2,797,628

GARDEN WEEDER

John A. Schrag, Portland, Oreg.

Application November 22, 1954, Serial No. 470,285

7 Claims. (Cl. 97—63)

My invention relates to garden weeders, and particularly to the type used to cultivate row crops. At the present time, it is common to use several different types of weeders, such, for example, as blade-type hoes and scuffle hoes. A blade-type hoe is used to chop out weeds, while a scuffle-type hoe is used to slice beneath the surface of a planted bed and between rows to cut weedy growth, severing particularly the roots thereof, so that the weeds lie upon the upper surface of the cultivated ground, wither, and die. Scuffle hoes take several different forms. Some are made with relatively flat, elongated blades and others are made with a section of wire. My type of garden weeder is of the latter type.

The object of my invention is to provide a garden weeder of the type which supports a top section of relatively thin wire in spaced relation to a head, which serves as a depth gauge for limiting the penetration of said wire into the ground to be weeded.

It is a further and more specific object of my invention to provide a garden weeder of this type with means for fastening the ends of the severing wire to the head and for adjusting the tension thereof without varying the lateral spacing of the wire from said head.

A further object of my invention is to provide simple, inexpensive devices for securing and fastening said wire in place, which device may be adjusted securely, rapidly and simply by means of a manually manipulatable adjusting screw.

A further object of my invention is to provide a weeder of this type which is constructed of parts of simply formed metal, so as to produce a tool which may be made and sold inexpensively yet without sacrificing strength, functional advantage, or adjustment and replacement of the parts thereof.

Further and other details of my invention are hereinafter described with reference to the accompanying drawings, in which:

Fig. 1 is an elevation of a tool embodying my invention, illustrating the manner in which the ends of the shearing wire are joined to the adjustable end pieces which maintain it in spaced relation to the head of said weeder and serve to vary the tension exerted upon said wire; and Fig. 2 is a fragmentary plan view of said weeder, with portions shown broken away to disclose details thereof and with other portions shown in dotted outline to illustrate the degree of movement of the parts when they are adjusted in varying the tension of the shearing wire.

A weeder embodying my invention comprises a head 1, constructed so that at least the ends 1a thereof are hollow. In the drawings, I illustrate that said head is made of an annular section of tubular steel. It is not essential that said head be tubular throughout, but only that said head be hollow or annular at the ends thereof. When I use the word annular, I do not wish to imply that said head is of circular outline, but only that it is ring-like, and it is illustrated as being of rectangular annular section. Secured to said head is a handle 2 which pierces the head laterally. Said handle is provided with a shoulder 2a and a riveted terminal end 2b. The portion 2c of said handle lying between said shoulder and said riveted terminal end spans the bore of the head 1, as is illustrated in Fig. 2.

Joined to said handle at a point spaced from said terminal end and extending obliquely toward the ends of the head are a pair of obliquely arranged braces 3. In the drawing, the ends of said braces are shown as being welded to the head and to the handle, respectively. The handle 2 adjacent the shoulder 2a is bent at an oblique angle so that the handle extends obliquely upwardly when the head thereof and the wire 4 associated therewith extend vertically, as when the tool is being used. This arrangement is shown most clearly in Fig. 2.

Extending into each of the ends 1a of the head is an L-shaped wire supporting member 5. The two legs 5a and 5b of each wire supporting member are of substantially equal length and form more or less a right angle. The point of joinder 5c engages the end of the head and fulcrums thereabout in the manner illustrated in dotted outline in Fig. 1. Adjacent the terminal end of the leg member 5b is a pocket 6a. This pocket engages the reduced end 7a of the adjusting bolt 7. Said bolt is threaded into the head at 8 and has a milled head 7b so that it can be turned by a screw driver and moved upwardly and downwardly thereby to tilt the wire supporting member and thereby to vary the tension in the wire 4.

The leg 5a extends at right angles to the longitudinal dimension of the head and is provided with a V-shaped notch 9 at its extremity. Said V-shaped notch diverges outwardly toward the tip of the leg 5a and is wider at said tip than the diameter of the wire 4 so as easily to receive the latter. At its inner or diverging point, it narrows to a point of lesser width than the diameter of the wire 4. Thus, when the wire is subjected to substantial tension, it tends to become wedged tightly in said V-shaped notch and is prevented from slipping therein. Further to prevent slippage, said wire is bent laterally at 4a to lie flatwise against the outer face of the leg portion 5a. The extremity is reversely bent at 4b and enters and engages a pierced hole 10 in said leg portion 5a. As has been pointed out, the V-shaped notch grips the wire and a bight is formed as the wire leaves said notch. The extremity 4b and the piercing and interlocking engagement with the hole 10 serves merely to insure against the disengagement of the wire and little force is exerted at this point.

The L-shaped wire supporting members are free to tip counterclockwise when the screw or adjusting bolt 7 is backed off. Lateral movement or rocking of said L-shaped wire supporting member in the head is inhibited because the leg portion 5b is substantially as wide as the bore of said head, as is most clearly shown in Fig. 2. This permits the L-shaped wire supporting members only to rotate about the end of the head with which the L-shaped wire supporting member is associated, fulcruming upon said end, in the manner illustrated in Fig. 1 of the drawings.

Thus, when it is desired to insert originally a length of wire 4 on said head, the screw or adjusting bolt may be backed off until each of the L-shaped wire supporting members lies in the position shown in dotted outline in Fig. 1. The wire 4 may thus be arranged to extend about the leg portions 5a of the wire supporting members, being bent about the outer faces of said members and with the intermediate portion lying within the V-shaped notches at the extremities of said legs 5a. The extremities are inserted through the pierced holes 10 and are bent downwardly to lock them in place, as is illustrated in Fig. 1.

Then the adjusting bolts or studs 7 may be threaded downwardly until the legs 5b of the wire supporting members are in face-to-face abutment with the floor 1b of the head. The wire is initially arranged with respect to the wire supporting members so that when the latter are arranged in this fashion, sufficient tension is induced in the wire 4 to adapt it for the purpose of severing weeds in a garden. I preferably use wire commonly referred to as piano wire, which not only has sufficient tensile strength but also flexibility, to permit it to be deformed to anchor the ends, as is illustrated and as has been defined. If it should develop that insufficient tension is induced when the parts are arranged as shown in full lines in Fig. 1, it is possible to back off one or both of the adjusting bolts 7 and shorten the wire effectively and then reseat the adjusting bolt. Ordinarily, however, the degree of tension is not critical. The wire supporting members may rotate upwardly within the limits indicated between full and dotted outline without permitting the point of joinder 5c of the L-shaped wire supporting members to come out of abutment with the associated end of the head. This is because the reduced end 7a lies within the pocket 6a in each of the wire supporting members. The fit is not so closely made that said end will be prevented from entering the pocket even when the wire supporting members are arranged in the position indicated in dotted outline in Fig. 1. The fit is sufficiently tight, however, so that the point of joinder 5c is in fulcruming position with the end of the head, that is in abutment therewith, to prevent the wire from slackening suddenly.

My tool is not limited to weed cutting, but may be used generally in cultivation, particularly of row crops. That is to say, it may be used for stirring up the soil, mulching, or any other use for which hoes are generally put.

I claim:

1. In a garden weeder comprising an elongated head and a handle joined therewith, said head having substantially tubular ends, each provided with a floor portion, a pair of wire supporting members engaging said head at the extremities thereof and a wire member stretched tautly therebetween and spaced laterally from said head, said wire supporting members each being of L-shaped contour with one leg portion thereof extending into the bore of an end of said head, with the other leg portion extending laterally thereof and with an intermediate portion abutting the said end of the head, which latter serves as a fulcrum upon which said wire supporting member rocks, thereby to vary the tension of said wire.

2. In a garden weeder comprising an elongated head and a handle joined therewith, said head having substantially tubular ends, each provided with a floor portion, a pair of wire supporting members engaging said head at the extremities thereof and a wire member stretched tautly therebetween and spaced laterally from said head, said wire supporting members each being of L-shaped contour with one leg portion thereof extending into the bore of an end of said head, with the other leg portion extending laterally thereof and with an intermediate portion abutting said end of the head, which latter serves as a fulcrum upon which said wire supporting member rocks, thereby to vary the tension of said wire, with the one leg portion being complementary to the conformation of the floor of said head.

3. In a garden weeder comprising an elongated head and a handle joined therewith, said head having substantially tubular ends, each provided with a floor portion, a pair of wire supporting members engaging said head at the extremities thereof and a wire member stretched tautly therebetween and spaced laterally from said head, said wire supporting members each being of L-shaped contour with one leg portion thereof extending into the bore of an end of said head, with the other leg portion extending laterally thereof and with an intermediate portion abutting the said end of the head, which latter serves as a fulcrum upon which said wire supporting member rocks, thereby to vary the tension of said wire, said other leg having a width corresponding closely to the width of the floor portion of said head, which thereby inhibits lateral motion of said wire supporting member.

4. In a garden weeder comprising an elongated head and a handle joined therewith, said head having substantially tubular ends, each provided with a floor portion, a pair of wire supporting members engaging said head at the extremities thereof and a wire member stretched tautly therebetween and spaced laterally from said head, said wire supporting members each being of L-shaped contour with one leg portion thereof extending into the bore of an end of said head, with the other leg portion extending laterally thereof and with an intermediate portion abutting the said end of the head, which latter serves as a fulcrum upon which said wire supporting member rocks, thereby to vary the tension of said wire, and having a seat positioned adjacent the extremity of said one leg portion, and an adjusting screw threaded in said head and having a terminal end conforming to and fitting said seat, said screw being positioned and arranged to exert force to move said one leg portion into face-to-face relation with the floor of said head.

5. In a garden weeder comprising an elongated head and a handle joined therewith, said head having substantially tubular ends, each provided with a floor portion, a pair of wire supporting members engaging said head at the extremities thereof and a wire member stretched tautly therebetween and spaced laterally from said head, said wire supporting members each being of L-shaped contour with one leg portion thereof extending into the bore of an end of said head, with the other leg portion extending laterally thereof and with an intermediate portion abutting the said end of the head, which latter serves as a fulcrum upon which said wire supporting member rocks, thereby to vary the tension of said wire, said wire terminating in laterally bent ends extending about the terminal ends of said other leg portion of each of the wire supporting members.

6. In a garden weeder comprising an elongated head and a handle joined therewith, said head having substantially tubular ends, each provided with a floor portion, a pair of wire supporting members engaging said head at the extremities thereof and a wire member stretched tautly therebetween and spaced laterally from said head, said wire supporting members each being of L-shaped contour with one leg portion thereof extending into the bore of an end of said head, with the other leg portion extending laterally thereof and with an intermediate portion abutting the said end of the head, which latter serves as a fulcrum upon which said wire supporting member rocks, thereby to vary the tension of said wire, said wire terminating in laterally bent ends extending about the terminal ends of said other leg portion of each of the wire supporting members, and having a reversely bent extremity piercing said other leg portion and interlocking therewith.

7. In a garden weeder comprising an elongated head and a handle joined therewith, said head having substantially tubular ends, each provided with a floor portion, a pair of wire supporting members engaging said head at the extremities thereof and a wire member stretched tautly therebetween and spaced laterally from said head, said wire supporting members each being of L-shaped contour with one leg portion thereof extending into the bore of an end of said head, with the other leg portion extending laterally thereof and with an intermediate portion abutting the said end of the head, which latter serves as a fulcrum upon which said wire supporting member rocks, thereby to vary the tension of said wire, said wire terminating in laterally bent ends extending about the terminal ends of said other leg portion of each of the wire supporting members, the terminal end of each of the other leg portions of the wire supporting members having a V-shaped notch formed therein diverging to a portion of lesser width than the diameter of said wire.

References Cited in the file of this patent

UNITED STATES PATENTS

| | | |
|---|---|---|
| 1,109,487 | Tsuboi | Sept. 1, 1914 |
| 1,361,360 | Bourke | Dec. 7, 1920 |
| 1,881,623 | Jassoy | Oct. 11, 1932 |
| 2,370,208 | Terray | Feb. 27, 1945 |

FOREIGN PATENTS

| | | |
|---|---|---|
| 463,185 | Great Britain | Mar. 23, 1937 |